United States Patent [19]

Pomié et al.

[11] 4,273,614
[45] Jun. 16, 1981

[54] CLOSURE DEVICE FOR FUEL ASSEMBLY POT

[75] Inventors: Pierre Pomié, Aix en Provence; Charley Renaux, Jouques, both of France

[73] Assignee: Commissariat a l'Energie Atomique, Paris, France

[21] Appl. No.: 959,732

[22] Filed: Nov. 13, 1978

[30] Foreign Application Priority Data

Nov. 29, 1977 [FR] France .................. 77 35844

[51] Int. Cl.³ .............................. G21C 19/20
[52] U.S. Cl. ...................... 176/30; 176/63; 414/146
[58] Field of Search ............... 176/19 R, 30, 31, 32, 176/38, 63; 414/146; 294/86 A; 4/403; 137/DIG. 2, 409, 429, 432, 449

[56] References Cited

U.S. PATENT DOCUMENTS

| | | | |
|---|---|---|---|
| 1,549,007 | 8/1925 | Khun | 137/429 |
| 1,946,616 | 1/1934 | Sandlin | 137/429 |
| 2,874,717 | 2/1959 | Johnson | 137/429 |
| 3,528,451 | 9/1970 | Hansen | 137/449 |
| 3,915,792 | 10/1975 | Aubert | 176/30 |
| 3,997,393 | 12/1976 | Allain | 176/30 |
| 4,070,239 | 1/1978 | Bevilacqua | 176/19 R |
| 4,090,917 | 5/1978 | Jabsen | 176/38 |

*Primary Examiner*—Donald P. Walsh

[57] ABSTRACT

Handling device for a fast neutron reactor cooled by a liquid metal such as sodium and of the type comprising a container with a vertical axis containing the core and a given volume of sodium contained in said container, defining above the core a free level surmounted by an inert gas cushion, a thick horizontal slab placed above the gas cushion and constituting the upper closure of a protective caisson surrounding the container, an inclined ramp which passes into the container up to a loading and unloading station located in the vicinity of the core and extending at its opposite end into a handling chamber supported by the slab, a second inclined ramp connecting the inside of the handling chamber to a second loading and unloading station positioned externally of the caisson in a storage container, a carriage carrying a handling pot able to move along the said ramps and moving the pot from a position where it is submerged below the sodium level to a position where it is introduced into the inert gas atmosphere above the sodium level, said pot being open at its upper end so as to permit the introduction or removal of the assembly to be handled when it is positioned vertically on its carriage with respect to said loading and unloading stations provided for this purpose in the reactor vessel and in the storage container, wherein during its displacement between said stations the carriage is associated, to the right of the upper open end of the pot, with a generally cylindrical enclosure which is open towards the bottom and provided with an upper part and in which is mounted a hollow member, whereof at least the lower part has a spherical shape, whereby the hollow member bears via the spherical lower part against the upper open end of the pot when the latter emerges above said level.

11 Claims, 4 Drawing Figures

CLOSURE DEVICE FOR FUEL ASSEMBLY POT

BACKGROUND OF THE INVENTION

The present invention relates to a handling device for an assembly, particularly for a fertile or fissile assembly of a fast neutron nuclear reactor with cooling by a liquid metal.

It is known that in such a reactor the assemblies constituting the reactor core are formed by open enclosures containing a bundle of sheathed needles of fertile or fissile material. These assemblies are juxtaposed and rest in a vertical position on a supporting member. The complete core assembly is submerged in a suitable volume of liquid metal, generally sodium, contained in a container which is open at its upper end and is suspended beneath a thick slab, particularly made from concrete which extends horizontally and encloses a protective caisson surrounding the container. The liquid sodium circulates from bottom to top in the enclosures of the assemblies in contact with the needles in such a way as to extract the calories given off by the latter, the heated sodium being taken up by heat exchangers and then on leaving the latter by pumps which return the cooled sodium beneath the supporting member for a further passage through the core. In operation, the mass of liquid sodium in the container generally reaches a given level, separated from the lower face of the slab by an inert gas, generally argon cushion.

At given intervals, variable according to the reactor operating conditions, it is necessary to replace the assemblies in the core. For this purpose, the installation has transfer means controlled from the outside of the protective caisson and which after traversing the slab are able to take up and extract one by one the assemblies in the core, whereby said assemblies are laterally displaced whilst maintaining them below the sodium level and finally they are deposited in a handling pot located at a loading and unloading station located on the side of the core and which is also beneath the sodium level. The handling pot is generally formed by an elongated receptacle open at its upper end via which the assembly is introduced and closed at its inner base, said pot generally being provided with means which, during its movement to an unloading station, permit the distribution and evacuation in acceptable proportions of the residual calories given off by the assembly.

In a generally adopted construction, the handling pot is placed on a carriage against which it bears whereby after tilting said carriage is able to move in an inclined ramp by means of a cable or pull chain, thereby making it possible to remove the carriage, handling pot and the assembly contained therein from the container and caisson in order to bring them in tightly sealed manner in a chamber provided externally of said caisson to a position above the slab where the carriage is tilted and then returned over another inclined ramp. It then once again traverses the slab, externally of the caisson, and issues into an appropriate storage container where the pot is again submerged beneath an appropriate volume of liquid sodium and finally arrives at a loading and unloading station. Advantageously, the attachment straps for the carriage are provided with a parachute brake system, which prevents the sudden dropping of the pot containing the assembly in the case of an accidental breakage of the pull cable. Such a device is in particular described and claimed in French patent application No. 2,192,057.

When the carriage and the pot are in a position vertical to the loading and unloading station of the reactor or storage container the attachment straps, whose lower end is connected to the carriage and whose upper end is connected to the parachute brake which always remains on the inclined ramp, are disposed obliquely and provide vertical access to the pot in order to permit the introduction or removal of an assembly.

During an unloading operation the handling pot is initially completely submerged below the sodium level. When the carriage arrives in the vicinity of the slab, the upper end of the pot emerges above this level into the inert gas cushion and then the whole pot progressively emerges so that it is totally penetrating the gaseous atmosphere in the container above the sodium level and communicates with the inside of the chamber.

Under these conditions the pot containing the assembly must be closed so as to prevent the evaporation of sodium, which may occur in the case of an accidental immobilisation of the pot in a partly or completely emerged position as a result of the rise in the sodium temperature. The drop in the sodium level may cause the circulation by convection of the sodium in contact with the assembly to stop, resulting in a local temperature rise which may even bring about a fusion of the fuel, which constitutes an inadmissible accident at the safety level.

BRIEF SUMMARY OF THE INVENTION

The present invention relates to a device for handling an assembly comprising a handling pot and a closing device ensuring the sealing of said pot in an automatic manner and without any mechanical action as soon as the upper end of the pot emerges from the sodium.

To this end, the present device intended for a fast neutron reactor cooled by a liquid metal such as sodium and of the type comprising a container with a vertical axis containing the core and a given volume of sodium contained in said container, defining above the core a free level surmounted by an inert gas cushion, a thick horizontal slab placed above the gas cushion and constituting the upper closure of a protective caisson surrounding the container, an inclined ramp which passes into the container up to a loading and unloading station located in the vicinity of the core and extending at its opposite end into a handling chamber supported by the slab, a second inclined ramp connecting the inside of the handling chamber to a second loading and unloading station positioned externally of the caisson in a storage container, a carriage carrying a handling pot able to move along the said ramps and moving the pot from a position where it is submerged below the sodium level to a position where it is introduced into the inert gas atmosphere above the sodium level, said pot being open at its upper end so as to permit the introduction or removal of the assembly to be handled when it is positioned vertically on its carriage with respect to said loading and unloading stations provided for this purpose in the reactor vessel and in the storage container, wherein during its displacement between said stations the carriage is associated, to the right of the upper open end of the pot, with a generally cylindrical enclosure which is open towards the bottom and in which is mounted a hollow member, whereof at least the lower part has a spherical shape, whereby the hollow member bears via the spherical lower part against the upper open end of the pot when the latter emerges above said level.

According to a first embodiment, the said member is constituted by a sphere.

According to a second embodiment, said member is constituted by a hemisphere having a planar upper face.

In a constructional variant of the device, the hollow member bears against the upper part of the enclosure when the pot and its carriage are submerged on the inclined ramps.

According to another variant, the hollow member also bears against the upper end of the pot when the latter and its carriage are submerged on the inclined ramps.

According to a special feature of the device, the upper open end of the handling pot has a conical bearing surface against which is applied the spherical part of the hollow member when said end emerges above the sodium level.

Advantageously, the hollow member is filled with an inert gas. The interior of the hollow member may also be maintained under vacuum.

According to a special embodiment of the invention, facing the open end of the pot the cylindrical enclosure has a contraction towards the inside of the enclosure able to retain the hollow member when there is no pot on the carriage.

According to a special embodiment of the invention, the upper part of the enclosure is provided with orifices.

According to another variant, the cylindrical enclosure laterally has longitudinal elongated openings diametrically opposed in pairs and in which are engaged transverse pins provided in the lateral surface of the spherical member.

BRIEF DESCRIPTION OF THE DRAWINGS

The invention is described in greater detail hereinafter relative to two embodiments of the device for closing a handling pot for a fuel assembly which are provided in non-limitative manner and with reference to the attached drawings, wherein show.

DETAILED DESCRIPTION OF THE PREFERRED EMBODIMENTS

Figure 1:
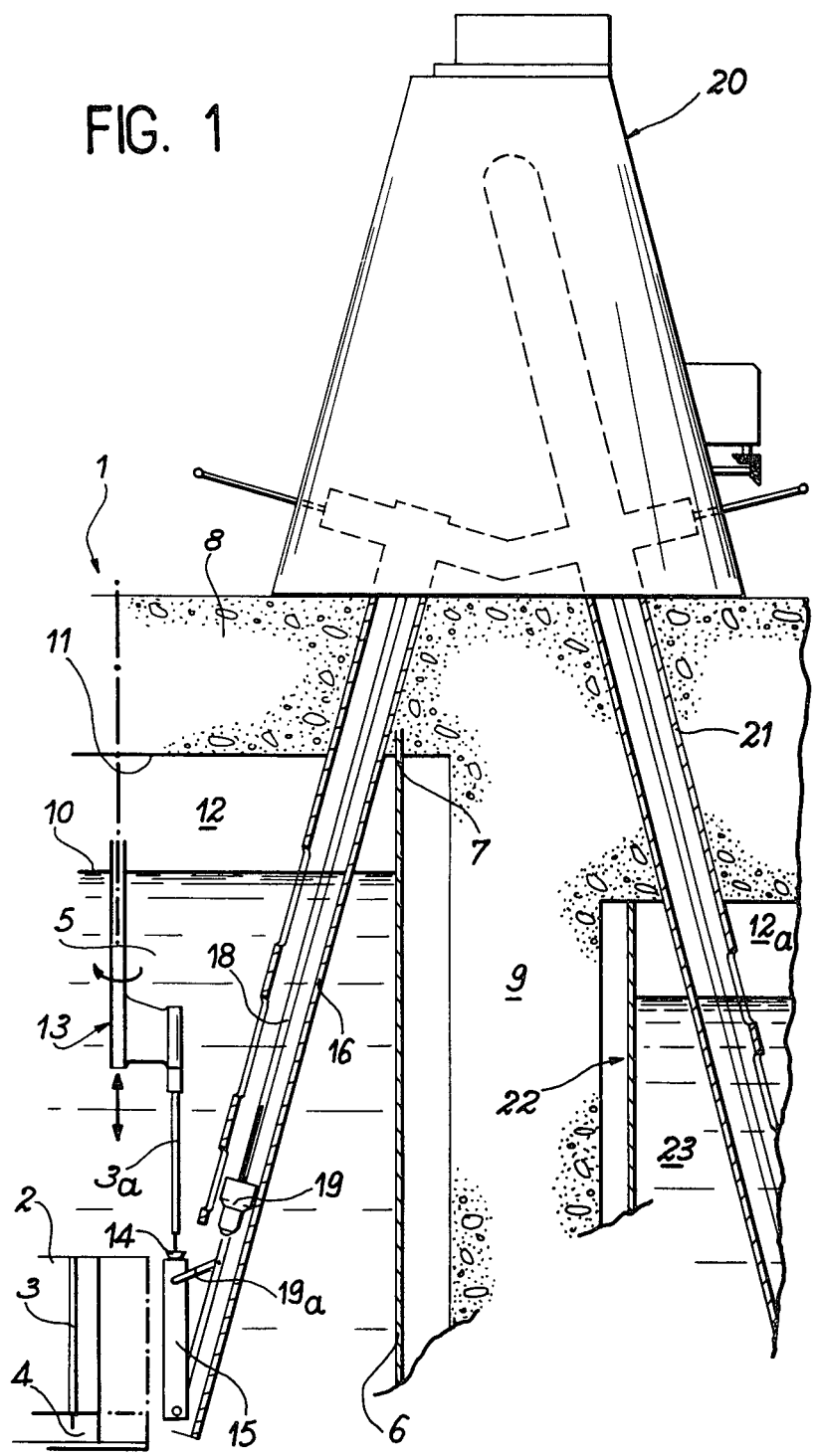
FIG. 1 a diagrammatic cross-sectional view partly showing a fast neutron reactor cooled by liquid sodium and which has a carriage for carrying a handling pot and a chamber.

In FIG. 1, reference numeral 1 diagrammatically designates the part of a fast neutron reactor with cooling by liquid sodium of a type well known in the art. The reactor comprises a core 2, formed by the juxtapositioning of a series of assemblies 3 maintained in the vertical position by the bottom or lower end thereof engaging in a supporting member 4. Core 2 is submerged beneath a suitable volume of liquid sodium 5 contained in an open container 6, whose upper end 7 is suspended beneath a thick horizontal slab 8 constituting the upper part of a protective caisson 9 surrounding the container 6. The sodium 5 in container 6 has a horizontal level 10 defining with the lower face 11 of slab 8 a space 12, which is normally filled with an inert gas, generally argon.

Also in known manner, the reactor has within the container 6 a device 13 for transferring assemblies 3 and which is in particular able to take up each of the assemblies within the core 2 and bring them to a loading and unloading station, whilst maintaining them submerged beneath the level 10 of sodium 5. The loading and unloading station is illustrated in the drawing where it is possible to see assembly 3a removed from the core and arranged perpendicularly with respect to a handling pot 14, whose upper end is open and whose lower base is closed. This pot rests on a carrying carriage 15. After introducing assembly 3a into pot 14, the carriage 15 is moved along an inclined ramp 16 extended at its upper end so as to pass out of the container 6, whereby it firstly passes through space 12 containing the inert gas and then slab 8. During this movement, carriage 15 is pulled on the inclined ramp 16 by means of a pull chain 18 connected to the carriage via two straps such as 19a connected to safety device 19 of the parachute brake type permitting in the case of an accidental breakage of the chain to prevent a sudden dropping of the carriage and handling pot containing the assembly, thereby greatly reducing the serious risks of damage to the internal structures of the reactor which would result from this. The carriage 15 containing pot 14 can thus be removed in a sealed manner from caisson 9 through slab 8 in order to be brought into a chamber 20 positioned externally of the caisson above slab 8. This chamber, whose constructional details are of little importance to the present invention, makes it possible to pivot carriage 15 so that it can be passed from inclined ramp 16 to a second inclined ramp 21 where, by a reverse movement, the carriage and the pot carried on it can be lowered into a storage container 22 and, after traversing a gaseous space 12a identical to space 12, can again be submerged beneath a sodium volume. Following tilting, the pot and its carriage are placed in a position vertical to the not shown loading and unloading station. The pot containing the assembly is then unloaded from the carriage and rests in the storage container until the residual activity given off by the assembly has decreased sufficiently.

As has been stated hereinbefore, the handling pot 14 into which has been introduced a fuel assembly 3a must be sealed once the pot and its carrying carriage emerge above the level 10 of the sodium and enter the atmosphere of the gas cushion 12 in communication with the inside of chamber 20.

Figure 2:
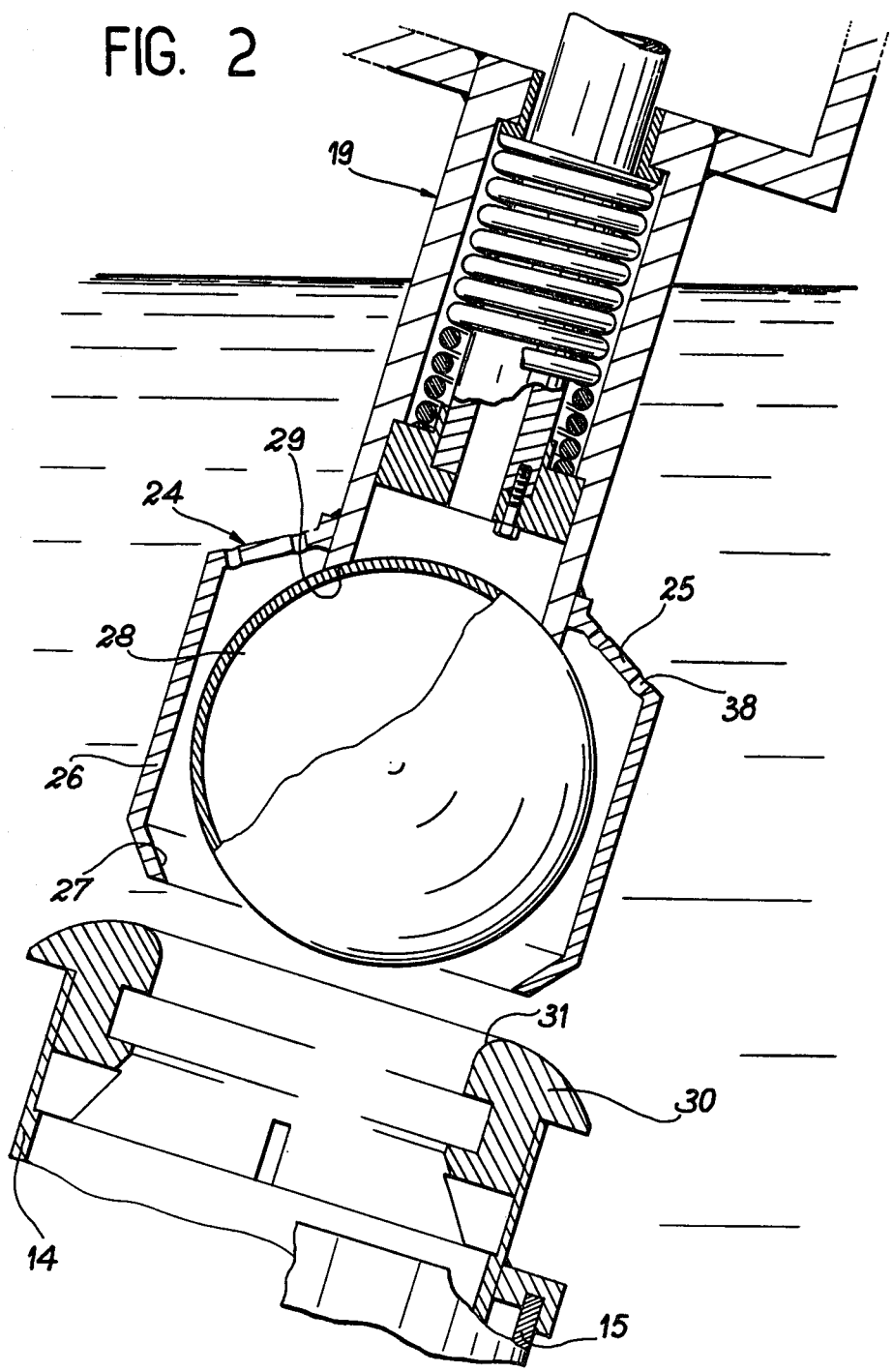
FIG. 2 a larger scale sectional view of the upper part of the handling pot illustrating the associated closing device, the hollow member being shown in the open position of the pot.
Figure 3:
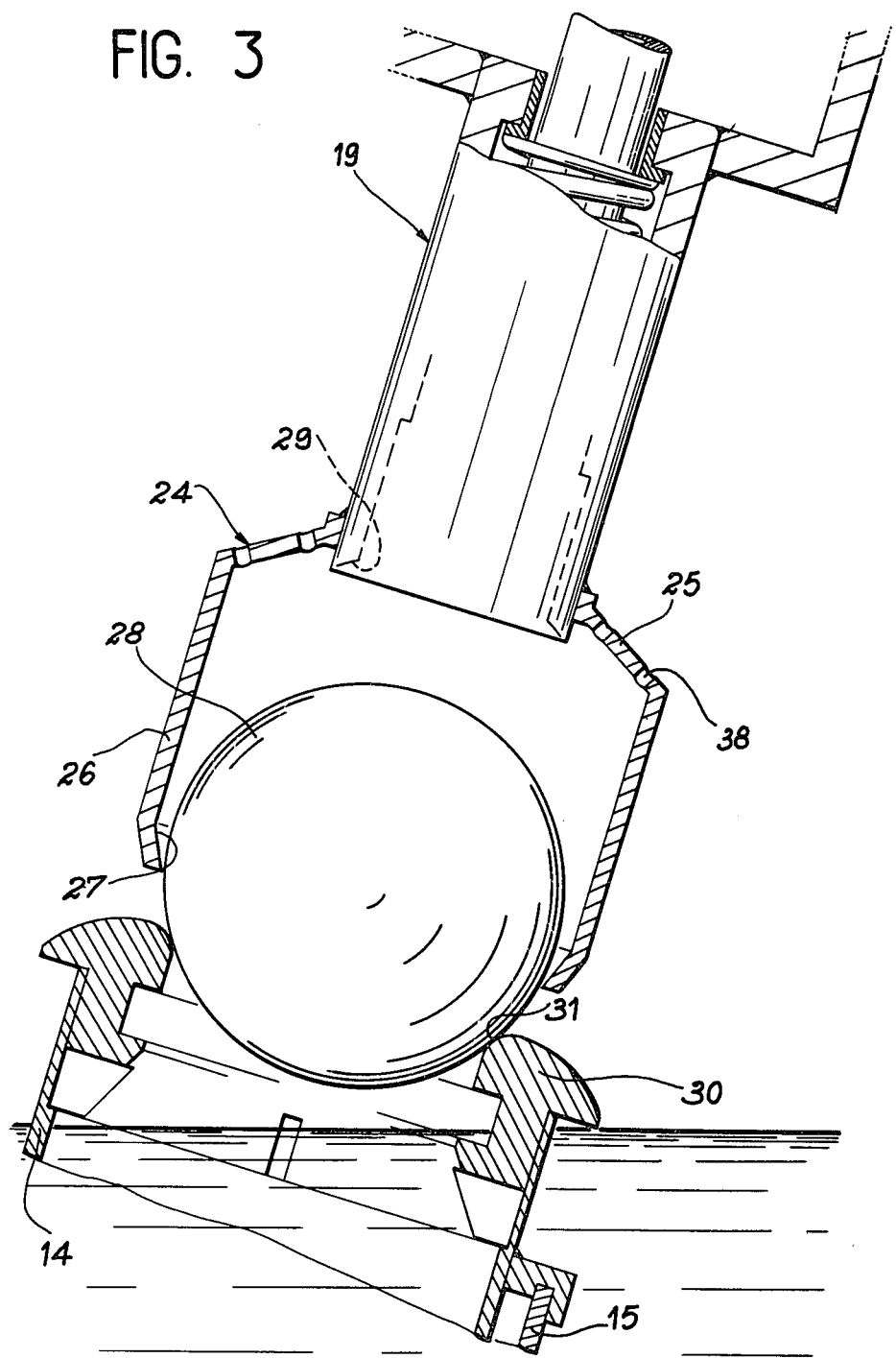
FIG. 3 a sectional view identical to FIG. 2 showing the hollow member with the pot in the closed position FIG. 4 a sectional view illustrating another variant of the closure device.

FIGS. 2 and 3 illustrate a first embodiment of the device which, according to the invention, makes it possible to ensure this automatic sealing of the handling pot. As can be seen in the drawings, the parachute brake 19 is provided at its lower end with an enclosure 24 having a transverse base 25 or upper part extended by a cylindrical collar terminated at its end directed towards pot 14 by an inwardly directed contraction 27. Enclosure 24 is able to house a hollow sphere 28, particularly made from stainless steel, filled with an inert gas, such as argon, whilst when carriage 15 does not carry pot 14 contraction 27 prevents the sphere 28 from escaping from the enclosure. According to a constructional variant, the inert gas atmosphere can be replaced by producing a vacuum within the hollow sphere 28.

When the carriage 15 carrying the handling pot 14 is submerged beneath level 10 (FIG. 2) sphere 28 as a result of the hydrostatic buoyancy due to the sodium surrounding it is applied against a bearing surface 29 located in the bottom of enclosure 24 which has orifices 28 to permit the passage of sodium. However, and as illustrated in FIG. 3, when the carriage 15 and handling pot 14 emerge above level 10 into the atmosphere of the inert gas cushion 12, the hollow sphere 28, under the action of its own weight, bears against the upper end 30 of pot 14 having a conical bearing surface 31, thereby permitting a substantially tight closure of pot 14.

According to another constructional variant, if sphere 28 is given the minimum appropriate thickness, it is possible to operate with pot 14 constantly closed by sphere 28, even in the submerged position. This result is achieved if the weight of the sphere exceeds the hydrostatic buoyancy due to the sodium. However, this variant has the disadvantage of leading to friction between sphere 28 and bearing surface 31 of the pot during the righting of the latter in order to bring it into a position which is vertical to one or other of the two loading and unloading stations. However, it is considered that the degree of friction occurring in sodium is relatively low.

Figure 4:
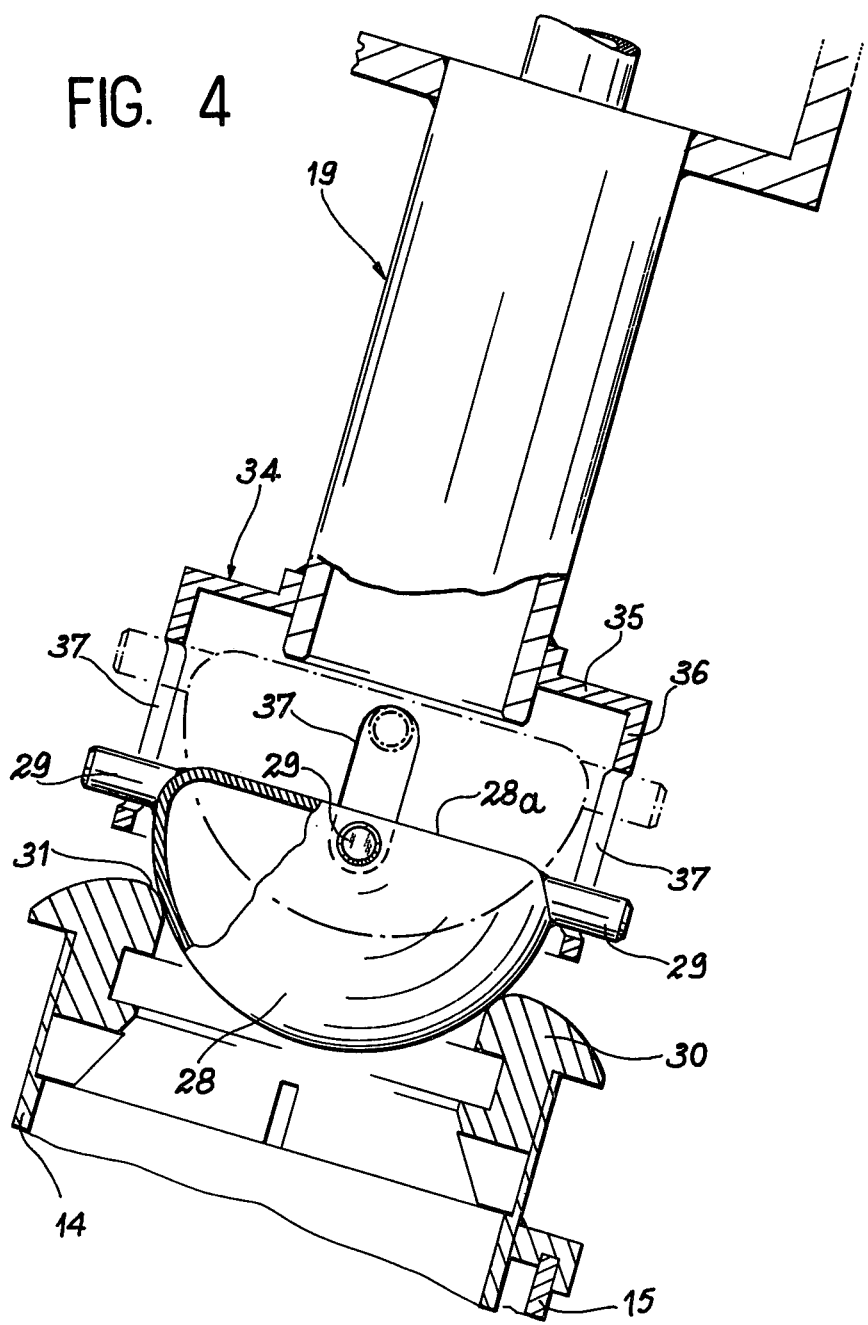

According to another variant illustrated in FIG. 4, parachute 19 is again associated with an enclosure 34 having a base 35 or upper part and a lateral collar 36, whereby the latter has a plurality of elongated longitudinal openings 37, which are advantageously diametrically opposed in pairs, there being four in the present embodiment. A hollow steel member 28 filled with argon is arranged within enclosure 34. This member substantially corresponds to a hemisphere and has a planar upper face 28a. Four transverse pins are respectively engaged in each of the openings 37 of enclosure 34. The upper end 30 of handling pot 14 again has a conical bearing surface 31. The device functions in the same way as the device described relative to FIGS. 2 and 3. The hollow member 28 is raised towards the upper part of enclosure 34 under the effect of hydrostatic buoyancy of the sodium when carriage 15 and pot 14 are submerged beneath sodium level 10, but when the carriage - pot assembly emerges above the sodium level and is located in the gaseous atmosphere, bearing takes place against the bearing surface 31 of pot 14 and the hollow member 28 then drops towards the bottom under the effect of its own weight. However, operation can also be obtained which is such that the pot is constantly sealed by the hollow member. In this embodiment, the lower the hydrostatic buoyancy the more easily this result is achieved (hemisphere). It should be noted that the overall dimensions in the vertical direction are reduced in this variant, making it possible to reduce the height of the handling chamber 20.

In this way, a device for the substantially tight and automatic closure of a handling pot is obtained, in which the hollow member used acts in the manner of a float, the bearing force of said member against the upper end of the pot being a function of the weight of the member when the pot is in the gaseous atmosphere. For information purposes, it is pointed out that for a stainless steel sphere with a thickness of 4 mm and an external diameter of 300 mm, the bearing force is approximately 8.5 kg. One of the advantages of the present device is that it is completely independent of the fixed loading and unloading structures of the handling pot and in particular the construction of the ramps, the chamber and the storage container. Moreover, this device is not dependent on the orientation of the pot on its carriage.

The invention is not limited to the embodiments described and represented hereinbefore and various modifications can be made thereto without passing beyond the scope of the invention.

We claim:

1. A handling device for a fast neutron reactor cooled by a liquid metal such as sodium and of the type comprising a container with a vertical axis containing the core and a given volume of sodium contained in said container, defining above the core a free level surmounted by an inert gas cushion, a thick horizontal slab placed above the gas cushion and constituting the upper closure of a protective caisson surrounding the container, an inclined ramp which passes into the container up to a loading and unloading station located in the vicinity of the core and extending at its opposite end into a handling chamber supported by the slab, a second inclined ramp connecting the inside of the handling chamber to a second loading and unloading station positioned externally of the caisson in a storage container, a carriage carrying a handling pot able to move along the said ramps and moving the pot from a position where it is submerged below the sodium level to a position where it is introduced into the inert gas atmosphere above the sodium level, said pot being open at its upper end so as to permit the introduction or removal of the assembly to be handled when it is positioned vertically on its carriage with respect to said loading and unloading stations provided for this purpose in the reactor vessel and in the storage container, wherein during its displacement between said stations the carriage is associated, to the right of the upper open end of the pot, with a generally cylindrical enclosure which is open towards the bottom and provided with an upper part and in which is mounted a hollow member, whereof at least the lower part has a spherical shape, whereby the hollow member bears via the spherical lower part against the upper open end of the pot when the latter emerges above said level.

2. A device according to claim 1, wherein said member comprises a sphere.

3. A device according to claim 1, wherein said member comprises a hemisphere having a planar upper face.

4. A device according to claim 1, wherein the hollow member bears against the upper part of the enclosure when the pot and its carrying carriage are located on the inclined ramps in the submerged position.

5. A device according to claim 1, wherein the hollow member also bears against the upper end of the pot when the latter and its carrying are located on the inclined ramps in the submerged position.

6. A device according to claim 1, wherein the upper open end of the handling pot has a conical bearing surface against which is applied the lower spherical part of the hollow member when said end emerges above the sodium level.

7. A device according to claim 1, wherein the hollow member is filled with an inert gas.

8. A device according to claim 1, wherein the inside of the hollow member is maintained substantially under vacuum.

9. A device according to claim 2, wherein the cylindrical enclosure facing the open end of the pot has a contraction directed towards the inside of the enclosure and which is able to hold back the sphere when the pot is not located on the carriage.

10. A device according to claim 1, wherein the upper part of the enclosure is provided with openings.

11. A device according to claim 3, wherein the cylindrical enclosure laterally has longitudinal elongated openings which are diametrically opposed in pairs and in which are engaged transverse pins provided in the lateral surface of the hollow member.

* * * * *